United States Patent [19]
MacLaughlin

[11] Patent Number: 5,571,949
[45] Date of Patent: Nov. 5, 1996

[54] LEAK DETECTION DEVICE AND COMPONENTS THEREFOR

[75] Inventor: Donald N. MacLaughlin, Midland, Mich.

[73] Assignee: Packaging Resources Incorporated, Coleman, Mich.

[21] Appl. No.: 502,832

[22] Filed: Jul. 14, 1995

[51] Int. Cl.$^6$ ................................................ G01M 3/04
[52] U.S. Cl. ........................................ 73/45.3; 73/41
[58] Field of Search ........................ 73/41, 45.1, 45, 73/45.3

[56] References Cited

U.S. PATENT DOCUMENTS

| | | |
|---|---|---|
| 410,300 | 9/1889 | Steegmuller ........................ 73/45.3 |
| 522,107 | 6/1894 | Clot ........................................ 73/45.3 |
| 586,072 | 7/1897 | Malmfelt ............................. 73/45.3 |
| 725,589 | 4/1903 | Rehfuss ............................... 73/45.3 |
| 1,754,321 | 4/1930 | Johnson . |
| 2,309,231 | 1/1943 | Bagley . |
| 2,432,871 | 12/1947 | Fedorchak et al. . |
| 3,163,035 | 12/1964 | Kinzie et al. ...................... 73/49.8 |
| 3,351,388 | 11/1967 | Frank . |
| 3,389,811 | 6/1968 | Frank . |
| 3,413,841 | 12/1968 | Weber . |
| 3,462,996 | 8/1969 | Frank . |
| 3,762,213 | 10/1973 | Nowicki . |
| 3,824,840 | 7/1974 | Amberg . |
| 4,648,313 | 3/1987 | Kokubun et al. .................. 99/289 R |
| 4,852,415 | 8/1989 | Bogatzki et al. . |
| 5,111,884 | 5/1992 | Striech et al. ..................... 166/382 |

*Primary Examiner*—Hezron E. Williams
*Assistant Examiner*—Jay L. Politzer
*Attorney, Agent, or Firm*—Brinks Hofer Gilson & Lione

[57] ABSTRACT

A leak detection device includes a container-rotating disc mounted for rotation about a rotation axis. Multiple container-supporting test heads are mounted to the disc for rotation about the rotation axis. Each test head includes a sealing assembly supported by a first cam follower and comprising a cylinder, and a piston supported by a second cam follower and received in the cylinder. First and second annular cams are mounted above the disc to operate the first and second cam followers, respectively, such that the sealing assemblies and the pistons are moved between respective upper and lower positions as the disc rotates with respect to the cams. The cams are shaped to press the sealing assemblies against the containers, to raise the pistons to draw a partial vacuum in the containers, and then to lift the sealing assemblies and any sealed containers for a vacuum test. An improved seal accommodates a wavy upper surface of the container. An improved test head includes a first element that supports the seal and a second element supported by the first cam follower, wherein the first and second elements are mounted for limited axial movement with respect to one another.

20 Claims, 4 Drawing Sheets

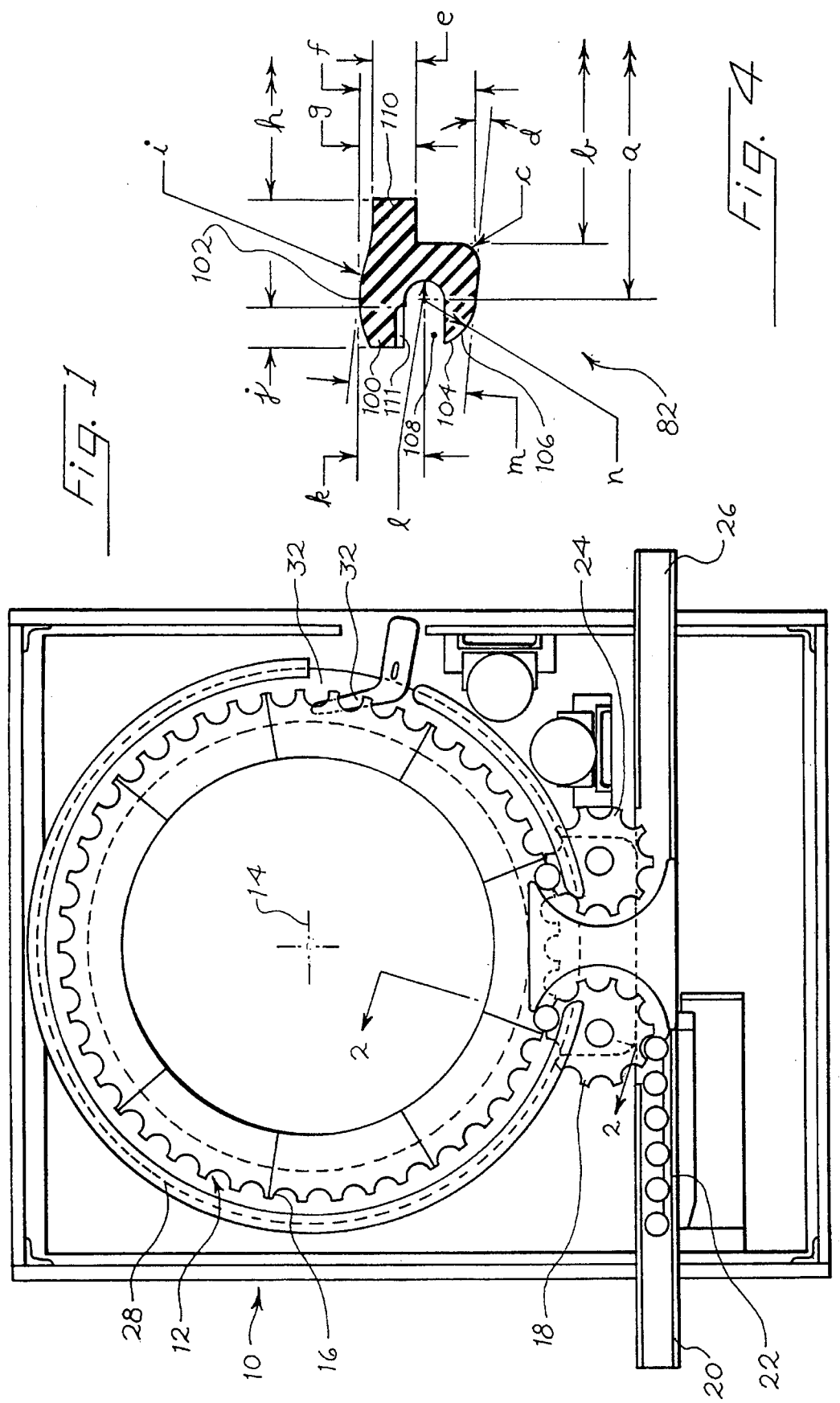

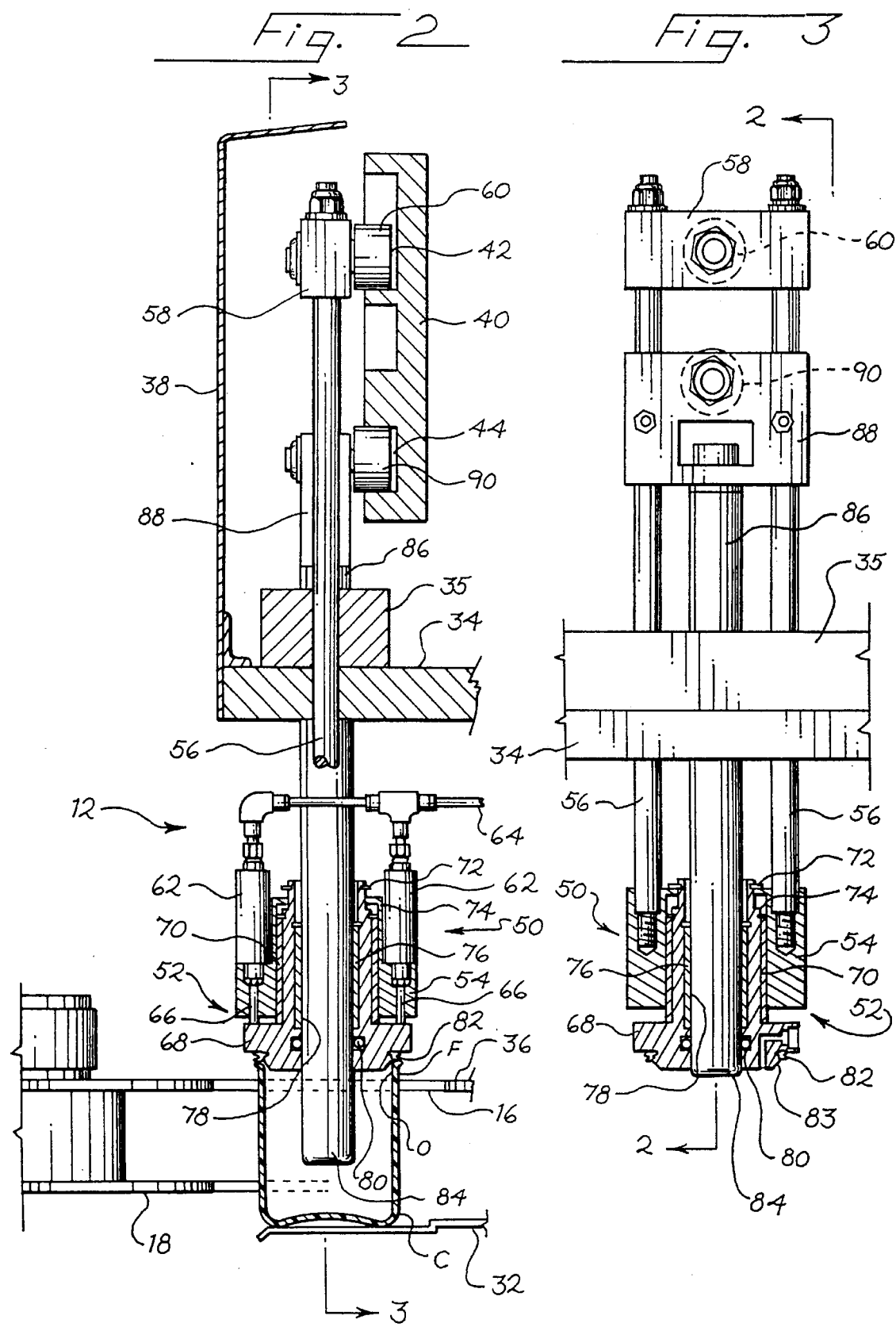

5,571,949

1

LEAK DETECTION DEVICE AND COMPONENTS THEREFOR

BACKGROUND OF THE INVENTION

This invention relates to a device for detecting defective containers, and to a test head and seal suitable for use in such a device.

Containers such as plastic barrier containers are in widespread use in many industries, including the pharmaceutical and the food industries. It is essential that such containers be leak proof if they are to perform their intended function. For example, plastic barrier containers can be designed to accept a metal closure which is secured to the container by metal seaming in a conventional manner. The defect rate of such plastic containers is extremely low, often less than 0.001 percent. Defects that do exist normally come in the form of a pin hole in the body of the container or a grossly deformed flange. Even this low defect rate can present a substantial problem, because even one defect entering a rotary retort can cause substantial loss of product and down time.

Leak detectors of various sorts are known in the art. For example, Nowicki U.S. Pat. No. 3,762,213 discloses a system for detecting leaks in bottles. A cam-operated test head is lowered by a first cam into sealing engagement with the bottle, and then a diaphragm is raised with a spring operating against a second cam. The cams are reciprocated relative to the bottle by a hydraulic cylinder to complete a test cycle. The Nowicki leak detector relies on oscillating cams positioned above a conveyor to operate a test head that is substantially fixed in position with respect to the direction of motion of the conveyor.

Weber U.S. Pat. No. 3,413,841 discloses a leak tester utilizing a rotary platform onto which containers are fed by a first starwheel, and from which containers are removed by a second starwheel. As shown in FIGS. 2a and 2b, a first cam is provided below the support surface for the containers, and this first cam raises and lowers the containers in various portions of the cycle. A second cam is positioned above the support surface for the containers, and the second cam is used to draw a vacuum.

The present invention is directed to an improved leak detector that is well suited for automatic use, and that provides improved sealing against the container and an efficient arrangement of parts.

SUMMARY OF THE INVENTION

According to a first aspect of this invention, a leak detection device includes a container-rotating disc mounted for rotation about a rotation axis, and a plurality of container-supporting test heads mounted to the disc for rotation about the rotation axis. Each test head comprises a sealing assembly supported by a first cam follower and comprising a cylinder, and a piston supported by a second cam follower and received in the cylinder. Each of the sealing assemblies comprises a seal configured to create a seal with one of the containers. First and second cams are provided, both mounted on a first side of the disc. The first and second cams are coupled to the first and second cam followers, respectively, such that the sealing assemblies and the pistons are moved between respective upper and lower positions as the disc rotates with respect to the cams. The cams are shaped to press the sealing assemblies against the containers, to raise the pistons to draw a partial vacuum in the containers, and then to lift the sealing assemblies and any sealed containers for a vacuum test.

2

This first aspect provides an efficient detection device which eliminates the need for a vertically moving support surface for the containers while providing all of the advantages of a rotating, disc-type system.

According to a second aspect of this invention, a test head for a leak detection device comprises a sealing assembly mounted for support to a first cam follower and comprising a cylinder, a piston mounted for support to a second cam follower and slideably received in the cylinder, and a seal configured to seal against a container. The seal comprises an elastomeric ring having upper and lower outwardly facing flanges separated by an annular recess.

This second aspect provides an efficient seal that has been found to seal reliably even against a wavy flange adjacent the opening of the container.

According to a third aspect of this invention, a test head for a leak detection device includes a sealing assembly mounted for support to a first cam follower and comprising a cylinder, and a piston mounted for support to a second cam follower and slideably received in the cylinder. The sealing assembly comprises a seal configured to seal against the container around the opening, a first element that supports the seal, a second element supported by the first cam follower. The first element is mounted for limited axial movement with respect to the second element, and a biasing device is coupled between the first and second elements to bias the first element into sealing engagement with the containers.

This third aspect provides an efficient test head that allows the first element and the seal to move relative to the second element and the cam follower. In this way efficient sealing is provided, even against containers that vary somewhat in height one from another.

BRIEF DESCRIPTION OF THE DRAWINGS

FIG. 1 is a schematic plan view of selected elements of a leak detection device that incorporates a preferred embodiment of this invention.

FIG. 2 is a sectional view taken along line 2—2 of FIG. 1 showing one of the test heads included in the device of FIG. 1.

FIG. 3 is a cross-sectional view taken along line 3—3 of FIG. 2.

FIG. 4 is an enlarged radial cross-section of the seal included in the test head of FIGS. 2 and 3.

DETAILED DESCRIPTION OF THE PRESENTLY PREFERRED EMBODIMENTS

Figure 5:
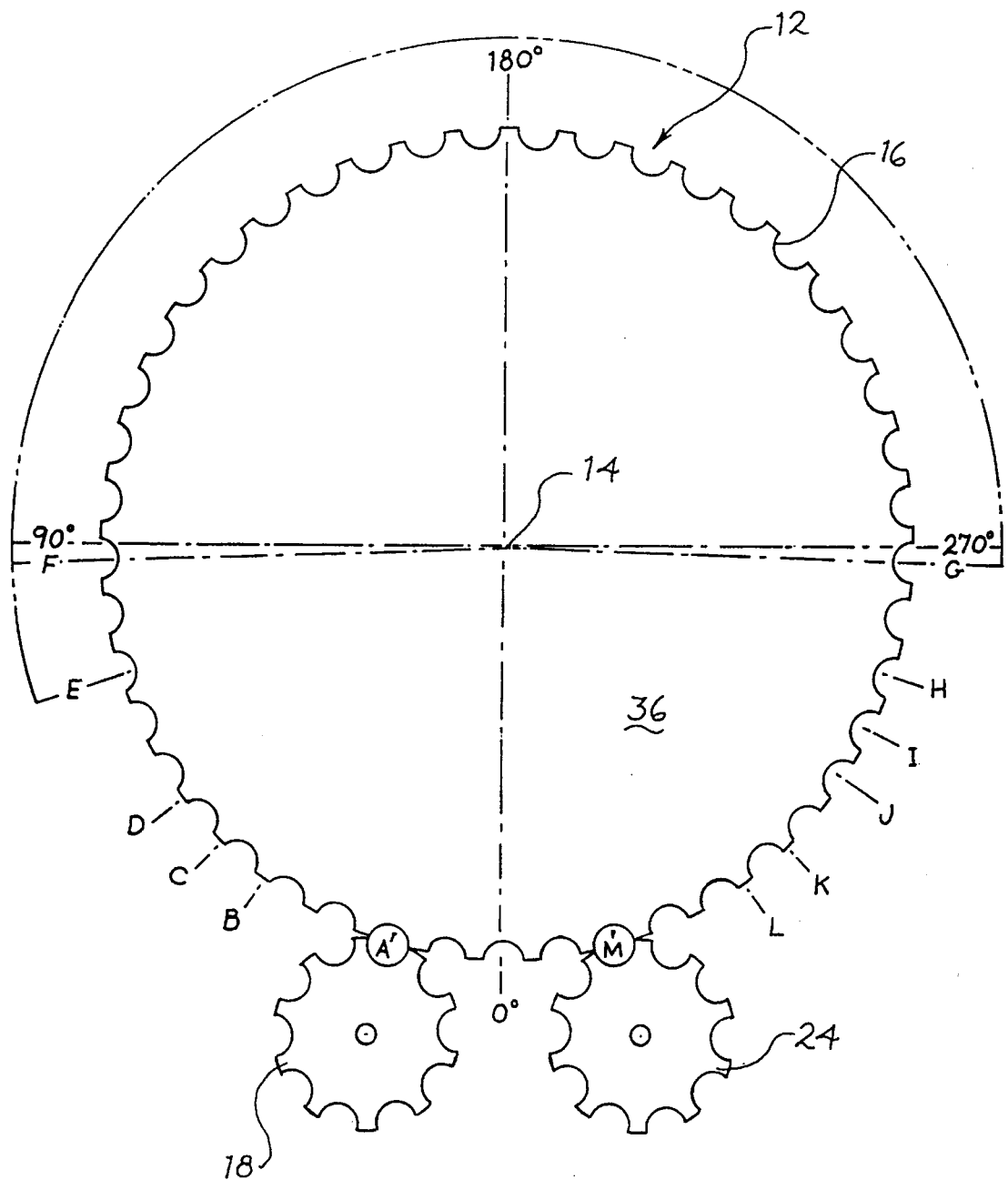
FIG. 5 is a schematic view of portions of the device of FIG. 1, showing successive stages in the operation of the test head.

Turning now to the drawings, FIG. 1 shows a schematic plan view of selected elements of a leak detection device 10 that incorporates the presently preferred embodiment of this invention. The device 10 includes a disc 12 that rotates about a vertical axis of rotation 14. The disc 12 defines an array of pockets 16 equally spaced around its perimeter.

The device also includes an infeed starwheel 18 interposed between an infeed conveyor 20 and the disc 12. An infeed screw 22 spaces containers appropriately for introduction into the infeed starwheel 18.

The device 10 also includes an outfeed starwheel 24 interposed between the disc 12 and an outfeed conveyor 26. A retainer 28 extends around the disc 12 to retain containers in the pockets 16. A sweep 30 is positioned adjacent a container-support surface 32 to remove leaking containers from the disc 12, as explained below.

In operation, containers to be tested for leakage enter via the infeed conveyor 20, are spaced by the infeed screw 22, and are then transported in a counterclockwise direction by the infeed starwheel 18 to the disc 12. The disc 12 rotates in a clockwise direction and transports containers from the infeed starwheel 18 to the outfeed starwheel 24. The outfeed starwheel 24 rotates in a counterclockwise direction to transfer containers from the disc 12 to the outfeed conveyor 26. Typically, the device 10 is placed ahead of conventional filling and seaming stations (not shown) to eliminate defective containers from the system, thus preventing defective containers from reaching the rotary retort.

As best shown in FIG. 2, the disc 12 includes a container-support surface 32, a guide disc 34, and a pocket-defining disc 36. The guide disc 34 is positioned parallel to and above the pocket-defining disc 36. A cover 38 is mounted to the periphery of the guide disc 34, and an annular cam 40 is fixedly mounted above the guide disc 34. The annular cam 40 does not participate in the rotation of the disc 12, which rotates as a unit with respect to the cam 40. The annular cam 40 defines upper and lower cam tracks 42, 44.

As best shown in FIGS. 2 and 3, a plurality of test heads 50 are provided, one for each of the pockets 16. The test heads 50 are not shown in FIG. 1 in order to improve clarity of the illustration.

Each of the test heads 50 includes a sealing assembly 52 that includes an outer ring 54. The outer ring 54 is suspended by two parallel guide rods 56 which are interconnected at their upper end by a cross bar 58. A rotatable cam follower 60 is mounted in the cross bar 58 so as to follow the upper cam track 42.

The outer ring 54 supports two biasing devices such as air cylinders 62. These air cylinders 62 are connected to an air line 64 that provides pressurized air to bias a rod 66 outwardly (downwardly in the view of FIG. 2) and thereby to prevent over-compression of the seal 82 described below. The guide rods 56 are guided in vertical motion by guide bushings 35 included in the guide disc 34. The vertical position of the outer ring 54 is determined by the upper cam track 42 and the cam follower 60.

Each sealing assembly 52 also includes an annular sealing element 68 on which is mounted an outer bushing 70. The sealing element 68 is mounted for limited axial movement in the outer ring 54. The limits of this axial movement are defined by a locking ring 72 and a shoulder 74 carried on the sealing element 68. The sealing element 68 also defines an inner bushing 76 which in turn comprises a cylinder 78. An O-ring seal 80 is mounted in place near a lower portion of the sealing element 68, beneath the inner bushing 76. The lower portion of the sealing element 68 defines a circumferential groove 83 in which is mounted an elastomeric seal 82.

A piston 84 is mounted to move axially in the cylinder 78, sealed by the O-ring 80. This piston 84 includes or is connected to guide rod 86 that extends vertically upwardly, parallel to and between the guide rods 56. Guide rod 86 terminates at its upper end in a cross bar 88 that in turn supports a cam follower 90. The cam follower 90 rides in the lower cam track 44, which determines the vertical position of the piston 84.

FIG. 2 shows the test head 50 positioned in sealing engagement with a container C having an opening O and a flange F. The seal 82 seals circumferentially around the flange F in a substantially vacuum-tight manner. In FIG. 2 the piston 84 and the sealing assembly 52 are shown in a lower position, while in FIG. 3 the piston 84 and the sealing assembly 52 are shown in an upper position.

FIG. 4 is a radial cross section of the seal 82. As shown in FIG. 4, the seal 82 includes an upper, outwardly facing flange 100 which defines an arcuate upper sealing surface 102. The seal 82 also includes a lower, outwardly facing flange 104 which defines a lower sealing surface 106. In this embodiment the lower sealing surface 106 is frustoconical, and it extends upwardly at an angle of about 8° with respect to a plane perpendicular to the center line (longitudinal axis) of the cylinder 78 and the piston 84. An annular recess 108 extends completely around the outer portion of the seal 82 a full 360 degrees, thereby allowing the lower flange 104 to move substantially with respect to the upper flange 100. The seal 82 also includes an inwardly facing flange 110 which is received in the groove 83 to hold the seal 82 in place on the sealing element 68. Two diametrically opposed channels 111 are provided on the lower portion of the upper flange 100 to prevent a vacuum from forming between the upper and lower flanges 100, 104 if they are pressed closely together.

FIG. 5 illustrates the sequential stages in the operation of the leak detection device 10. Table 1 summarizes stages A–M discussed below. In the following discussion, the reference numerals of FIGS. 1–3 are used.

TABLE 1

| Stage (FIG. 5) | Location | Event |
| --- | --- | --- |
| A | 16° | Piston starts down stroke (2.31") |
| B | 36° | Piston finishes down stroke; Sealing assembly starts down stroke (1") |
| C | 44° | Sealing assembly finishes down stroke |
| D | 52° | Piston starts up stroke (1.31") |
| E | 72° | Piston finishes up stroke relative to sealing assembly; Sealing assembly begins up stroke (1"); Vacuum test begins |
| F | 88° | Sealing assembly finishes up stroke |
| G | 272° | Vacuum test ends |
| H | 288° | Sealing assembly begins down stroke (1"); Piston begins down stroke (2.31") |
| I | 296° | Sealing assembly finishes down stroke |
| J | 307° | Piston finishes down stroke; Sealing assembly begins up stroke (1") |
| K | 316° | Piston starts up stroke (2.31") |
| L | 324° | Sealing assembly finishes up stroke |
| M | 344° | Piston finishes up stroke |

Containers are placed on the pocket-defining disc 36 at stage A, where the piston 84 starts a downward stroke. At stage B the piston finishes its downward stroke and the sealing assembly 52 begins a downward stroke. By stage C this downward stroke is completed, and the test head 50 is in substantially the position shown in FIG. 2. At stage D the piston 84 starts an upward stroke, and at stage E the sealing assembly 52 begins an upward stroke. The upward strokes of the piston 84 and the sealing assembly 52 are completed at stage F.

With a leak-free container the upward stroke of the piston 84 will draw a sufficient vacuum to hold the container in place on the sealing assembly 52 as the sealing assembly is raised. The raised container is then carried around in a clockwise direction to station G, which is the end of the vacuum test. A grossly defective container may not be lifted at all above the container support disc 32. A container having a pin hole leak may be lifted initially but may fall back into contact with the container support disc 32 prior to stage G. Any container that is on the support disc prior to stage G is removed from the disc 12 by the sweep 30.

Containers which pass the leak test are held above the sweep 30.(FIG. 1) by the test head 50 past stage G. At stage H both the piston 84 and the sealing assembly 52 begin downward strokes to return the container into contact with the container support disc 32. The sealing assembly 52 reaches the fully down position at stage I, and the piston 84 reaches the fully down position at stage J, thereby mechanically breaking the vacuum. At stage J the sealing assembly 52 begins an upward stroke, and at stage K the piston 84 begins an upward stroke. The sealing assembly 52 reaches the fully up position at stage L, and piston 84 reaches the fully up position at stage M. At stage M a container which has passed the leakage test is removed from the disc 12 by the outfeed starwheel 24.

Figure 6:
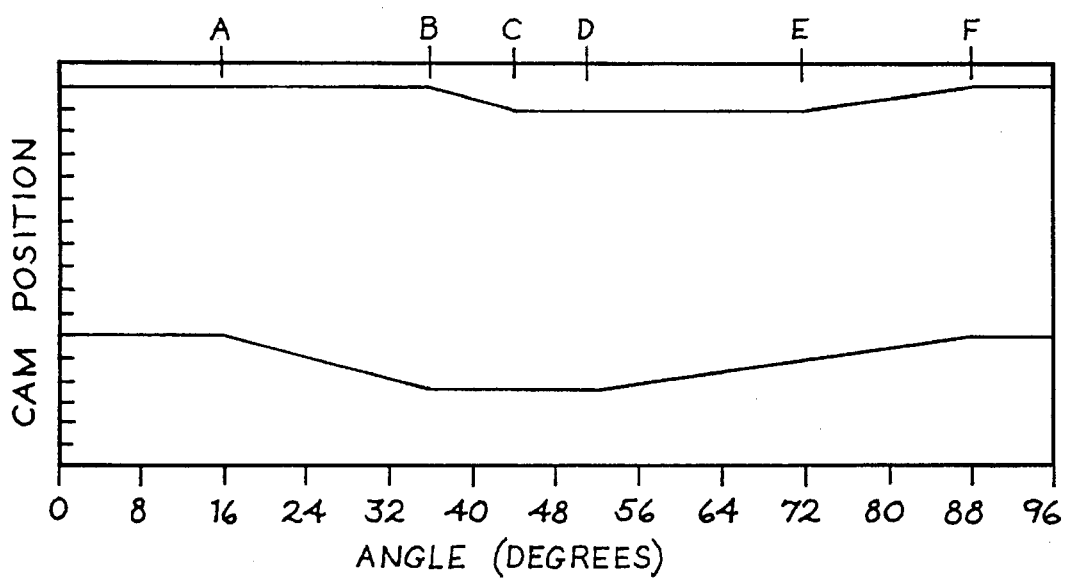
FIG. 6 is a schematic diagram showing a cam profile for the angular range 0°–96° suitable for use in the device of FIGS. 1–5.
Figure 7:
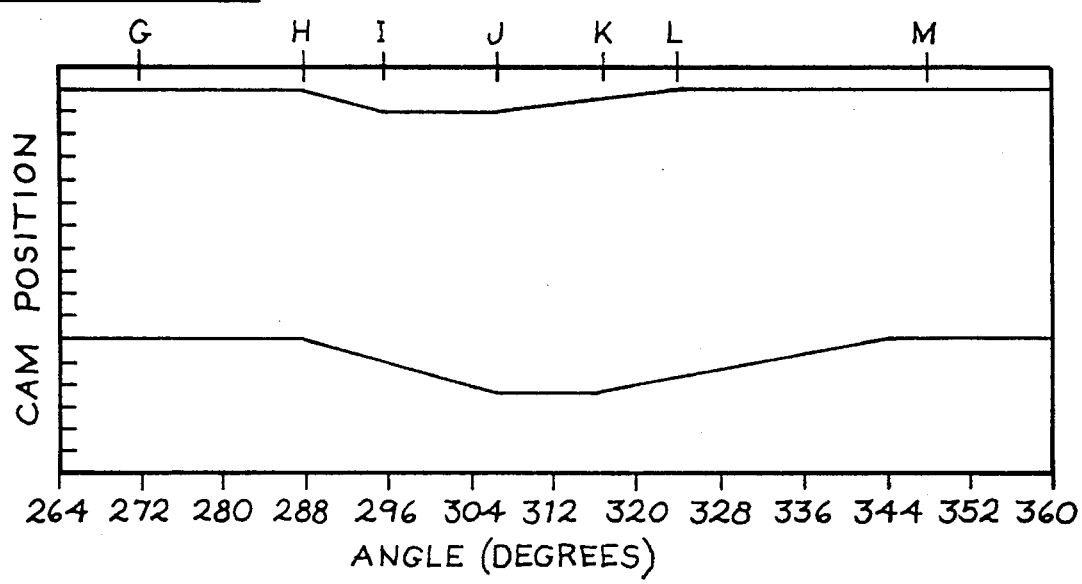
FIG. 7 is a schematic view similar to that of FIG. 6 showing a cam profile for the angular range 264°–360°.

FIGS. 6 and 7 illustrate presently preferred positions of the upper and lower cam tracks 42, 44 as a function of angle. Stages A–M discussed above in conjunction with FIG. 5 have been marked on FIGS. 6 and 7.

The following details of construction are provided merely to define the presently preferred embodiment of this invention. It should be clearly understood that these details are intended only by way of illustration, and that they can readily be modified as appropriate for the particular application.

In this case the pocket-defining disc 36 defines 45 pockets 16, and it is rotated at 16 RPM. This provides a time of 3.75 seconds per revolution, and a vacuum test time equal to 2.08 seconds. The piston 84 is in this embodiment 1 inch in diameter, and the strokes of the upper and lower cam tracks 42, 44 are 1 and 2.31 inches, respectively. This arrangement draws a displacement vacuum of approximately 1.8 to 2.1 inches of vacuum within the container C under perfect sealing, no leak conditions. In a case of a small leak, the container C will fall from the test head 50 at approximately 0.5 inches of vacuum. The cam tracks 42, 44 trap the cam followers 60, 90, respectively, in order to provide positive control of the required motions. The air cylinders 62 can provide a combined biasing force of about 40 pounds per test head.

The seal 82 can be dimensioned as appropriate for the particular containers being tested. Table 2 lists presently preferred dimensions for one application involving a container C with a flange angle of 10°–15°.

TABLE 2

| Reference Symbol (FIG. 4) | Dimension (inch) |
| --- | --- |
| a | 2.718 (Dia) |
| b | 2.579 (Dia) |
| c | 0.025 (Radius) |
| d | 8° |
| e | 0.060 |
| f | 0.161 |
| g | 0.075 |
| h | 2.46 (Dia) |
| i | 0.168 (Radius) |
| j | 0.056 |
| k | 0.085 |
| l | 0.0275 (Radius) |
| m | 0.154 |
| n | 0.695 (Radius) |

Materials can be chosen as appropriate for the particular application. For example, the seal 82 can be formed of an FDA approved white silicone of 25 durometer (Shore A). This material is preferably not post cured.

The leak detection device described above provides a number of important advantages. Since the containers C move in continuous circular motions, problems related to intermittent starting and stopping of the containers are substantially limited. Since both of the cam tracks 42, 44 are positioned on the same side of the disc 12, maintenance, assembly and access are all facilitated.

The air cylinders 62 bias the seals 82 into contact with the containers C. In this way the advantages of positive location of the outer ring 54 via the upper cam track 42 are combined with resilient biasing forces tending to seat the seal 82 in place.

The upper flange 100 of the seal 82 is provided with an arcuate upper sealing surface 108 that provides excellent sealing, even as the upper flange 100 is rotated by varying sealing pressures. The frusto-conical shape of the lower sealing surface 106 provides an effective seal against the rim R. The annular recess 108 allows the lower sealing surface 106 to move substantially in a vertical direction with respect to the upper sealing surface 102, while providing an effective seal. The top of a plastic container flange can be slightly wavy, and this is not considered a defect. The features of the seal 82 described above allow the seal to conform to a slightly wavy surface (+/−0.025 inches) and still create an effective seal.

Of course, it should be understood that a wide range of changes and modifications can be made to the preferred embodiments described above. For example, the device 10 can include a greater or lesser number of pockets 16 and test heads 50. Biasing devices other than the air cylinder 62 can be substituted, as for example various types of springs. Also, the various aspects of this invention can be used separately from one another. For example, the improved seal of this invention can be used in other types of test heads, or other types of leakage detection devices. Similarly, the test head described above can be used with other types of seals and in other types of leakage detection devices.

It is therefore intended that the foregoing detailed invention be regarded as illustrative rather than limited, and that it be understood that it is the following claims, including all equivalents, which are intended to define the scope of this invention.

I claim:

1. A leak detection device for containers, each of said containers comprising an opening, said device comprising:

a container-rotating disc mounted for rotation about a rotation axis;

a plurality of container-supporting test heads mounted to the disc for rotation about the rotation axis, each test head comprising a sealing assembly and a piston, each sealing assembly supported by a first cam follower and comprising a cylinder, and each piston supported by a second cam follower and received in the respective cylinder, each of the sealing assemblies comprising a seal configured to create a seal with one of the containers around the opening; and first and second annular cams, both mounted on a first side of the disc, the first and second cams coupled to the first and second cam followers, respectively, such that the sealing assemblies and the pistons are moved between respective upper and lower positions as the disc rotates with respect to the cams;

said cams shaped to press the sealing assemblies against the containers, to raise the pistons to draw a partial vacuum in the containers, and then to lift the sealing assemblies and any sealed containers for a vacuum test.

2. The invention of claim 1 wherein each sealing assembly comprises:

a first element that supports the seal and comprises the cylinder;

a second element supported by the first cam follower, said first element mounted for limited axial movement with respect to the second element; and a biasing device coupled between the first and second elements to bias the first element into sealing engagement with said one of the containers.

3. The invention of claim 2 wherein the biasing device comprises at least one air cylinder.

4. The invention of claim 1 wherein the seal comprises an elastomeric ring comprising upper and lower outwardly facing flanges separated by an annular recess.

5. The invention of claim 4 wherein the upper flange comprises an upper sealing surface that seals against the first element, said upper sealing surface comprising an arcuate surface in radial cross section.

6. The invention of claim 4 wherein the lower flange comprises a lower sealing surface that seals against the container adjacent to the opening, said lower sealing surface having a generally frusto-conical shape sloping away from the first element in a radially inward direction.

7. The invention of claim 6 wherein the lower sealing surface slopes at an angle of about 8° with respect to a plane transverse to a longitudinal axis defined by the cylinder.

8. The invention of claim 4 wherein the elastomeric ring further comprises a radially inwardly facing flange received in a mating groove formed in the first element.

9. The invention of claim 1 wherein the rotation axis is oriented substantially vertically, and wherein both cams are mounted above the disc.

10. The invention of claim 9 wherein the disc comprises a substantially horizontal container-support surface.

11. The invention of claim 10 wherein the container-support surface is fixed in vertical position on the disc.

12. A test head for a leak detection device for containers, each of said containers comprising an opening, said test head comprising:

a sealing assembly mounted for support to a first cam follower, said sealing assembly comprising a cylinder;

a piston mounted for support to a second cam follower and slideably received in the cylinder; and a seal configured to seal against the container adjacent to the opening, said seal comprising an elastomeric ring having upper and lower outwardly facing flanges separated by an annular recess;

said upper flange comprising an upper sealing surface that seals against the sealing assembly;

said lower flange comprising a lower sealing surface that seals against the container adjacent to the opening.

13. The invention of claim 12 wherein said upper sealing surface comprises an arcuate surface in radial cross section.

14. The invention of claim 13 wherein said lower sealing surface comprises a generally frusto-conical shape sloping away from the sealing assembly in a radially inward direction.

15. The invention of claim 14 wherein the lower sealing surface slopes at an angle of about 8° with respect to a plane transverse to a longitudinal axis defined by the cylinder.

16. The invention of claim 12 wherein the elastomeric ring further comprises a radially inwardly facing flange received in a mating groove formed in the sealing element.

17. A test head for a leak detection device for containers, each of said containers comprising an opening, said test head comprising:

a sealing assembly mounted for support to a first cam follower and comprising a cylinder;

a piston mounted for support to a second cam follower and slideably received in the cylinder;

said sealing assembly comprising:

a seal configured to seal against the container around the opening;

a first element that supports the seal;

a second element supported by the first cam follower, said first element mounted for limited axial movement with respect to the second element; and a biasing device coupled between the first and second elements to bias the first element into sealing engagement with the containers.

18. The invention of claim 17 wherein the biasing device comprises at least one air cylinder.

19. The invention of claim 17 wherein the first element is mounted to the first cam follower by two spaced, parallel first rods; and wherein the piston is mounted to the second cam follower by a second rod, said second rod positioned between and parallel to the first rods.

20. The invention of claim 17 wherein the cylinder is centered on a longitudinal axis, and wherein one of the cam followers is positioned between the other of the cam followers and the piston, when viewed along a direction transverse to the longitudinal axis.

* * * * *